US009042600B2

(12) United States Patent
Endo

(10) Patent No.: US 9,042,600 B2
(45) Date of Patent: May 26, 2015

(54) VEHICLE DETECTION APPARATUS

(75) Inventor: Osamu Endo, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 103 days.

(21) Appl. No.: 13/188,653

(22) Filed: Jul. 22, 2011

(65) Prior Publication Data

US 2012/0027255 A1 Feb. 2, 2012

(30) Foreign Application Priority Data

Jul. 27, 2010 (JP) ................................. 2010-167988

(51) Int. Cl.
*G06K 9/00* (2006.01)

(52) U.S. Cl.
CPC ........ *G06K 9/00798* (2013.01); *G06K 9/00825* (2013.01)

(58) Field of Classification Search
None
See application file for complete search history.

(56) References Cited

U.S. PATENT DOCUMENTS

| 6,587,043 | B1 * | 7/2003 | Kramer ..................... 340/435 |
| 6,873,912 | B2 * | 3/2005 | Shimomura ................ 701/301 |
| 6,882,287 | B2 * | 4/2005 | Schofield ................... 340/903 |
| 7,113,867 | B1 * | 9/2006 | Stein .......................... 701/301 |
| 7,365,769 | B1 * | 4/2008 | Mager ....................... 348/113 |
| 7,566,851 | B2 * | 7/2009 | Stein et al. ................ 250/205 |
| 7,764,808 | B2 * | 7/2010 | Zhu et al. .................. 382/104 |
| 2002/0167589 | A1 * | 11/2002 | Schofield et al. ......... 348/148 |
| 2007/0221822 | A1 * | 9/2007 | Stein et al. ................ 250/205 |
| 2007/0263901 | A1 * | 11/2007 | Wu et al. ................... 382/104 |
| 2008/0024325 | A1 * | 1/2008 | Kobayashi et al. ........ 340/939 |
| 2008/0069400 | A1 * | 3/2008 | Zhu et al. .................. 382/103 |
| 2008/0088481 | A1 * | 4/2008 | Kumon et al. ............. 340/937 |
| 2009/0296415 | A1 | 12/2009 | Heinrich et al. |
| 2009/0303356 | A1 * | 12/2009 | Min et al. ................... 348/241 |
| 2010/0026806 | A1 | 2/2010 | Heinrich et al. |
| 2010/0172542 | A1 * | 7/2010 | Stein et al. ................ 382/103 |
| 2011/0285850 | A1 * | 11/2011 | Lu et al. ..................... 348/148 |

FOREIGN PATENT DOCUMENTS

| JP | 06-276524 | 9/1994 |
| JP | 2008-037240 | 2/2008 |
| JP | 2010-000957 | 1/2010 |
| WO | WO03/093857 | 11/2003 |

OTHER PUBLICATIONS

Japan Patent Office, official communication in patent application No. 2010-167988 (Mar. 18, 2014).
Extended European Search Report dated Nov. 3, 2014, issued in European Application No. EP 11 17 5167 (6 pages).
Lin, Yu-Chen, et. al., "Adaptive IPM-Based Lane Filtering for Night Forward Vehicle Detection" IEEE Conference on Industrial Electronics and Applications 1568-1573 (2011).
Wang, Chun-Che, et al., "Driver Assistance System for Lane Detection and Vehicle Recognition with Night Vision" IEEE/RSJ International Conference on Intelligent Robots and Systems, 6 pages (2005).

* cited by examiner

*Primary Examiner* — Tsung-Yin Tsai
(74) *Attorney, Agent, or Firm* — Fish & Richardson P.C.

(57) ABSTRACT

A vehicle detection apparatus comprises an other-vehicle detection module configured to detect points of light in an image captured by a vehicle to which the vehicle detection module is mounted and to detect other vehicles based on the points of light, a vehicle lane-line detection module configured to detect an vehicle lane-line in the captured image, and a region sectioning module configured to section the captured image based on the detected vehicle lane-line into an own vehicle lane region, an oncoming vehicle lane region, and a vehicle lane exterior region. Other vehicles are detected by the other-vehicle detection module by detecting points of light based on respective detection conditions set for each of the sectioned regions.

15 Claims, 6 Drawing Sheets

VEHICLE DETECTION APPARATUS

CROSS REFERENCE TO RELATED APPLICATION(S)

This application claims the benefit of priority of Japanese Patent Application No. 2010-167988, filed on Jul. 27, 2010, the disclosure of which is incorporated by reference herein.

TECHNICAL FIELD

Embodiments described herein relate to a vehicle detection apparatus that detects other vehicles based on an image captured of a region in front of a vehicle installed with the vehicle detection apparatus.

RELATED ART

Illumination with a high beam light distribution is desirable for the headlights of a vehicle, such as a car, for the purpose of increasing visibility in a region in front of the vehicle. However, a high beam light distribution can sometimes dazzle the driver of a vehicle ahead or the driver of an oncoming vehicle present in the region in front of the vehicle itself. To address this issue, technology is proposed in Japanese Patent Document JP-A-2008-37240 for securing visibility in the region in front of a vehicle while also preventing dazzling a driver of a vehicle ahead or of an oncoming vehicle. In the proposed technology, a determination is made as to whether or not there is an illumination prohibited object, such as a vehicle ahead or an oncoming vehicle, present in the region in front of a vehicle. Illumination with a high beam light distribution then is prohibited if there is an illumination prohibited object present in the region. Japanese Patent Document JP-A-2010-957 also discloses securing visibility in the region in front of a vehicle while preventing dazzling of the driver of a vehicle ahead or of an oncoming vehicle. This is achieved by a camera capturing an image of a region in front of the vehicle and detecting in the image obtained the vehicle position of any other vehicles present in the forward region. A low beam light distribution then is illuminated towards the detected vehicle position, and a high beam light distribution is illuminated towards positions where vehicles are not detected.

When detecting whether or not other vehicles are present in the region in front of the vehicle for controlling the light distribution of the headlights in the foregoing patent documents, a method is employed, as in JP-A-2010-957, whereby a camera captures an image of a region in front of the vehicle, and the image obtained is subjected to image analysis to detect any other vehicles present. In order for this to be performed, it is necessary to discriminate whether or not points of light seen in the captured image are light from a vehicle light, such as the lights of a vehicle ahead or of an oncoming vehicle, or whether the light is from a stationary light, such as the light of a building or road marker lighting. Therefore, for example, points of light are detected in the image, and, by detecting attributes of each point of light, such as the size, shape, color, distribution and movement path, a determination is made as to whether or not the point of light is light from a headlight or light from a taillight of another vehicle, or light from a stationary light. However, such a method requires that such a determination be performed for all of the points of light in the captured image, which results in a large number of data points for processing, and an extreme load for determination processing. This makes it difficult to detect a vehicle ahead or an oncoming vehicle quickly, and consequently also makes it difficult to control in real-time the light distribution from the headlights of the vehicle itself. Furthermore, a problem arises because falsely detecting even a single detected attribute makes it difficult to discriminate between a vehicle illumination device and a stationary light, thus lowering the detection accuracy of other vehicles.

Embodiments described herein are directed towards a vehicle detection apparatus with higher detection accuracy for quickly detecting other vehicles based on captured images.

SUMMARY

A vehicle detection apparatus according to an exemplary embodiment of the invention comprises:
  an other-vehicle detection module configured to detect points of light in an image captured by a vehicle to which the vehicle detection module is mounted and to detect other vehicles based on the points of light;
  a vehicle lane-line detection module configured to detect an vehicle lane-line in the captured image; and
  a region sectioning module configured to section the captured image based on the detected vehicle lane-line into an own vehicle lane region, an oncoming vehicle lane region, and a vehicle lane exterior region,
  wherein other vehicles are detected by the other-vehicle detection module by detecting points of light based on detection conditions set for each of the sectioned regions.

In some implementations, the region sectioning module can be configured to employ the most distant point on the vehicle lane-line as a dividing position. For the oncoming vehicle lane region, the other-vehicle detection module can be configured to detect by prioritizing for points of white light. For the own vehicle lane region the other-vehicle detection module can be configured to detect by prioritizing for points of red light. For the vehicle lane exterior region the other-vehicle detection module can be configured to detect by prioritizing to reduce a detection sensitivity for points of light.

In some implementations, the vehicle detection apparatus detects vehicle lane-lines in a captured image, and based on the detected vehicle lane-line, divides the captured image into an own vehicle lane region, an oncoming vehicle lane region, and a vehicle lane exterior region (road shoulder region). The likelihood of detecting a vehicle ahead, an oncoming vehicle and a stationary light can accordingly be raised in each of the regions. By setting detection conditions such that prioritized detection is performed for objects in each of the regions with high detection likelihoods, detection of each of the respective detection objects can be accomplished quickly. It also is possible to reduce false detections. Other aspects, features and advantages will be apparent from the following detailed description, the accompanying drawings and the claims.

DETAILED DESCRIPTION

Figure 1:
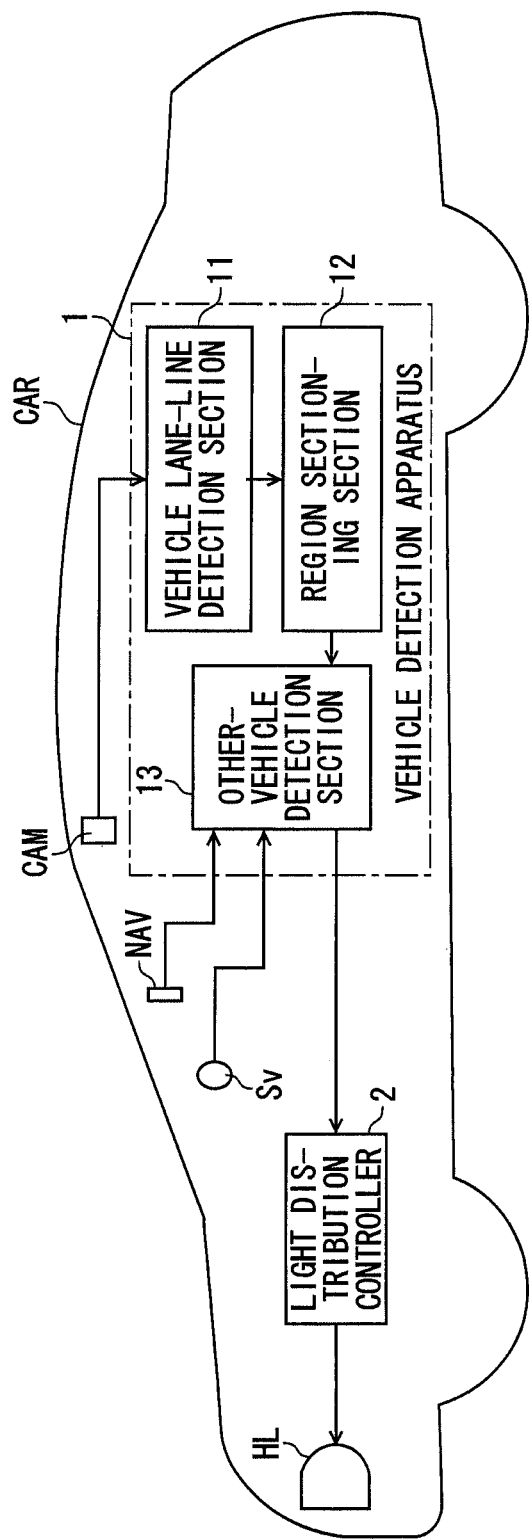
FIG. 1 is a schematic diagram showing an example of a vehicle that has a vehicle detection apparatus.

The following explanation describes an exemplary embodiment, with reference to the drawings. FIG. 1 is a schematic configuration diagram in which an example of a vehicle detection apparatus of the invention is applied to a headlight control apparatus for controlling light distribution of a headlight. A vehicle CAR is mounted with an imaging camera CAM for capturing an image of a region in front of the vehicle itself, and a vehicle detection apparatus 1 for detecting other vehicles based on the image obtained with the imaging camera CAM. The vehicle detection apparatus 1 includes a light distribution controller 2 that serves as a headlight control device for controlling the light distribution of the headlights HL used for illuminating a region in front of the vehicle itself according to other vehicle detection by the vehicle detection apparatus 1.

The headlights HL can be switched between a high beam light distribution and a low beam light distribution under control of the light distribution controller 2. To perform such light distribution switching, a shade (light blocking plate) is provided to the headlights HL for setting the low beam light distribution. The headlights HL can be configured as a lamp that provides a high beam light distribution by driving the shade. Alternatively, the headlight may be configured as a composite formed from multiple lamp units having light distributions that differ from each other, and with the light distribution switched by selective illumination of these lamp units.

A digital camera equipped with a standard image capture element can be employed as the imaging camera CAM. The illustrated example includes a digital camera having a CDD image capture element or MOS image capture element for outputting an image signal corresponding to the captured image.

The vehicle detection apparatus 1 of the illustrated example includes: a vehicle lane-line detection section 11 for detecting vehicle lane-lines marked with white or yellow lines on the road in the image captured by the imaging camera CAM; a region sectioning section 12 for sectioning the captured image into plural regions based on detected vehicle lane-lines; and an other-vehicle detection section 13 for detecting points of light in the image and detecting attributes of the points of light so as to detect other vehicle(s) separately for each sectioned region. The other-vehicle detection section 13 serves as a device for acquiring road data and, in this exemplary embodiment, is connected to a car navigation device NAV and to a vehicle speed sensor Sv for ascertaining the travelling state of the vehicle itself. The other-vehicle detection section 13 refers to data from the car navigation device NAV and the vehicle speed sensor Sv to detect the attributes of detected points of light, detects whether or not the points of light are from another vehicle or from a stationary light based on the detected attributes, and then proceeds to detect whether or not any other vehicle is a vehicle ahead or an oncoming vehicle.

Figure 2A:
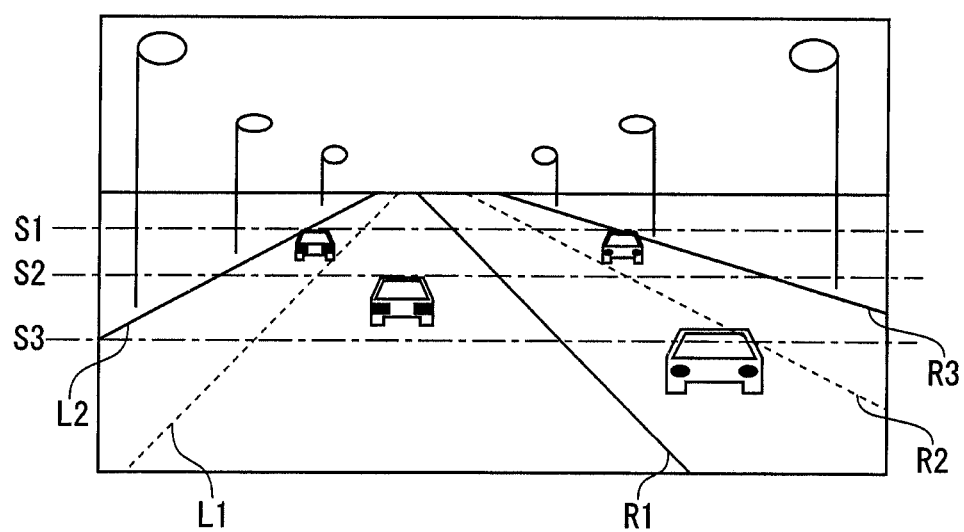
FIGS. 2A and 2B are schematic diagrams relating to a method of detecting vehicle lane-lines by a vehicle lane-line detection section.
Figure 2B:
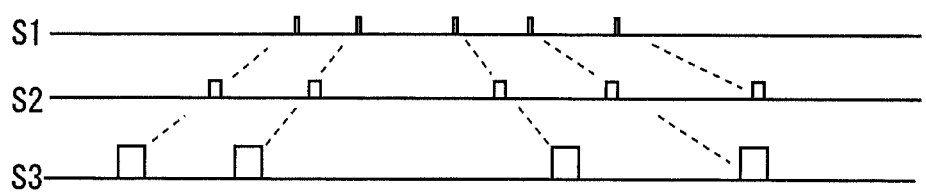

An example of an initial image captured in a time series is illustrated in FIG. 2A. The vehicle lane-line detection section 11 scans along the scan lines S1, S2, S3, for example, and acquires light level signals such as those shown in FIG. 2B. The vehicle lane-line detection section 11 then detects points of high light intensity, which are referred to as points of light, in the image from the light level signals, and detects vehicle lane-lines where these points of light in the image are arrayed in a continuous pattern, or where the points of light are arrayed in a non-continuous but regular pattern. Since an image is captured in which the white or yellow vehicle lane-line markings on the road surface have a requisite brightness, it is possible to detect vehicle lane-lines in an image with high reliability by obtaining the brightness of vehicle lane-lines imaged in advance, and then detecting any points of light of brightness close to the previously detected values as vehicle lane-lines.

From out of the detected vehicle lane-lines, the vehicle lane-line detection section 11 detects a vehicle lane-line at a position on the right hand side of the facing direction of the vehicle itself as being a first right side vehicle lane-line R1. Similarly, it detects a vehicle lane-line detected at a position on the left hand side of the facing direction as being a first left side vehicle lane-line L1. When one or more vehicle lane-lines (in this example two vehicle lane-lines) are detected on the right hand side of the first right side vehicle lane-line R1, they are detected as right side vehicle lane-lines allocated with sequential numbers, in this example these being the second right side vehicle lane-line R2 and the third right side vehicle lane-line R3. Similarly with the left side vehicle lane-lines, left side vehicle lane-lines are detected and allocated sequential numbers, in this example the single second left side vehicle lane-line L2.

Figure 3A:
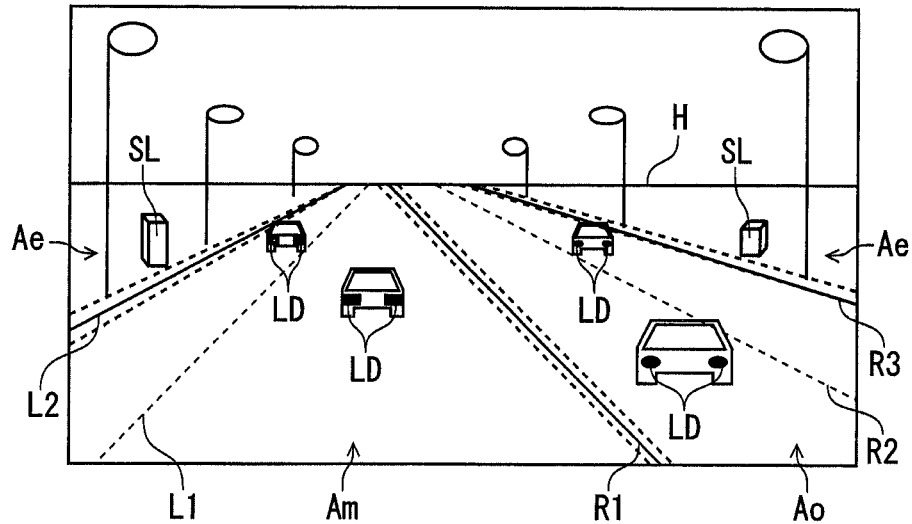
FIGS. 3A and 3B are schematic diagrams relating to vehicle lane-lines and sectioned regions.
Figure 3B:
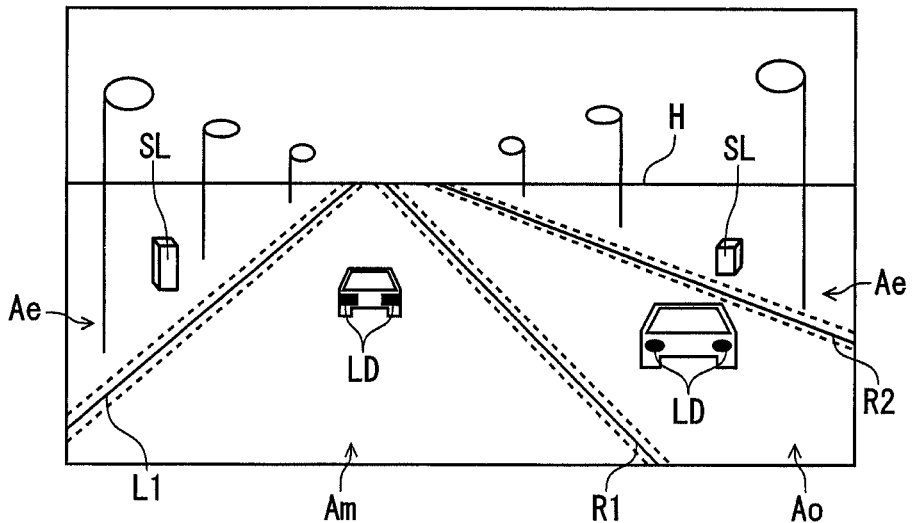

The region sectioning section 12 divides the image into multiple vehicle lane regions based on the vehicle lane-lines detected by the vehicle lane-line detection section 11. Based on road data, such as that obtained from the car navigation device NAV mounted to the vehicle itself and various types of traffic data, sectioning is performed into an own vehicle lane region, an oncoming vehicle lane region, and also into regions outside of the vehicle lanes, called road shoulder regions and vehicle lane exterior regions. As shown in FIG. 3A, if it is determined from the road data that the vehicle itself is travelling on a road with two lanes in each direction, the sectioning divides the image into an oncoming vehicle lane region Ao between the first right side vehicle lane-line R1 and the third right side vehicle lane-line R3, an own vehicle lane region Am from the first right side vehicle lane-line R1 across the first left side vehicle lane-line L1 to the second left side vehicle lane-line L2, and vehicle lane exterior regions Ae on the outside of both these two regions, these being the region further to the right hand side than the third right side vehicle lane-line R3 and the region further to the left hand side than the second left side vehicle lane-line L2. As shown in FIG. 3B, if it is determined from the road data that the vehicle itself is travelling on a road with a single lane each way, then the sectioning divides the image into an own vehicle lane region Am sandwiched between the first right side vehicle lane-line R1 and the first left side vehicle lane-line L1, and an oncoming vehicle lane region Ao adjacent on the right hand side of the own vehicle lane region Am and sandwiched between the first right side vehicle lane-line R1 and the second right side vehicle lane-line R2. The region to the right hand side of the second right side vehicle lane-line R2 and the region to the left hand side of the first left side vehicle lane-line L1 are respectively sectioned as vehicle lane exterior regions Ae. In this example, sectioning into regions is made about the distant ends in the image in the far-near direction of the one or more right side vehicle lane-lines and the left side vehicle lane-lines, namely about points on the ground at the lane-line intersections with the horizon line H so that each of the regions is sectioned in a radial shape radiating from these centers of division.

The other-vehicle detection section 13 scans the captured image and detects points of light in the image, detects the attributes of the detected points of light, and detects whether they are emitted from another vehicle or from a stationary light. In the case of another vehicle, it is determined whether or not it is a vehicle ahead or an oncoming vehicle. The other-vehicle detection section 13 includes a specific detection algorithm as the detection conditions for detecting the attributes of points of light. Such a detection algorithm can operate according to the following rules, and applies these rules to each of the sectioned regions separately.

(a) Priority is given to detecting points of white light when detection is in the oncoming vehicle lane region.

(b) Priority is given to detecting points of red light when detection is in the own vehicle lane region.

(c) Priority is given to lowering the detection sensitivity for points of light when detection is in the vehicle lane exterior regions.

Figure 4:
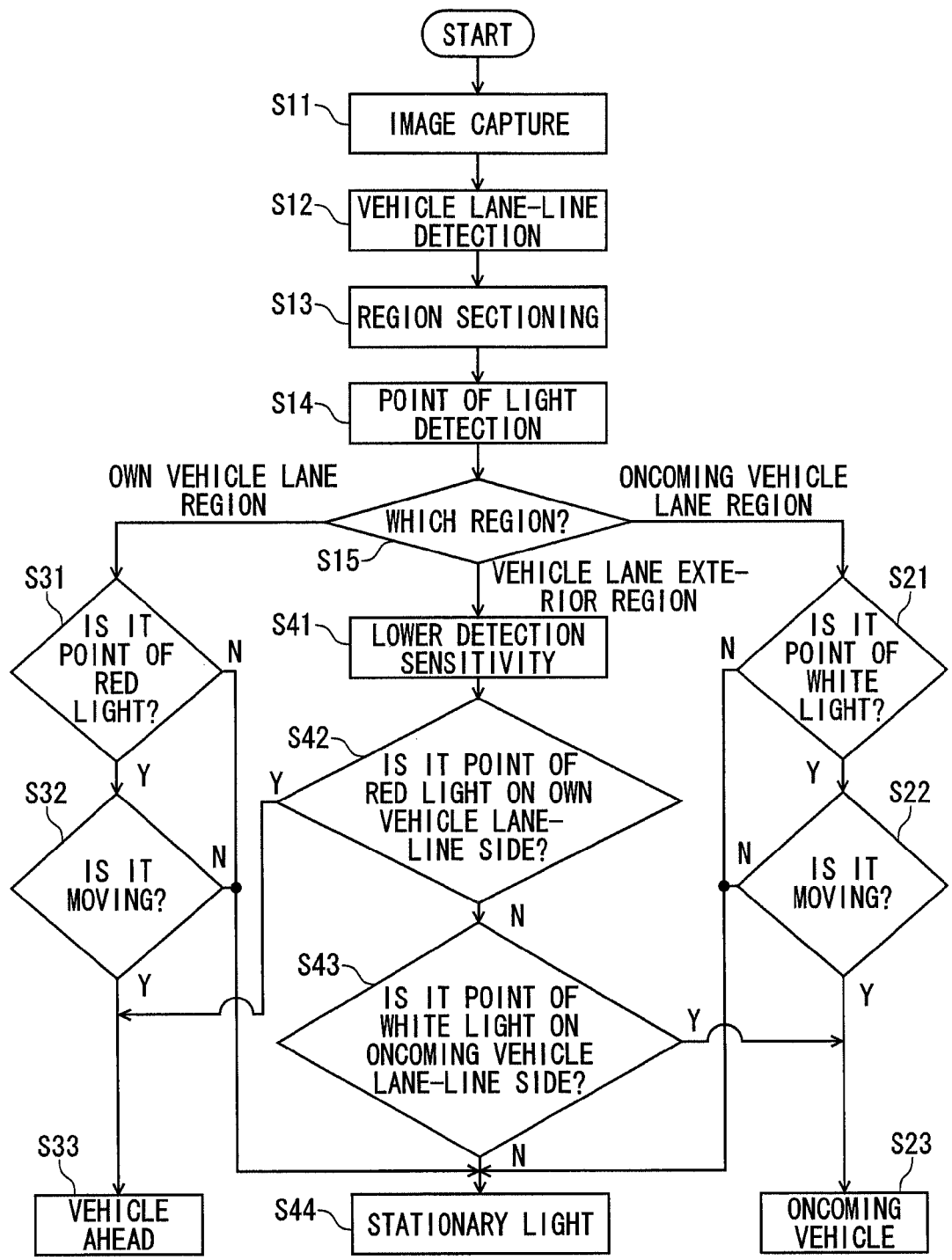
FIG. 4 is a flow chart relating to the detection operation for other vehicles.

The following explanation describes the detection operation for other vehicles by the vehicle detection apparatus 1, with reference to the flow chart of FIG. 4. When an image of a region in front of the vehicle itself has been captured by the imaging camera CAM (S11), the vehicle lane-line detection section 11 detects vehicle lane-lines (S12) based on the image initially obtained. The region sectioning section 12 then sections the image into an own vehicle lane region, an oncoming vehicle lane region, and a vehicle lane exterior region (S13) based on the detected vehicle lane-lines. The other-vehicle detection section 13 then detects points of light in the image, and determines which of the sectioned regions each of the detected points of light fall in (S14). Detection for other vehicles can be performed subsequently for each of the determined regions according to the following algorithms.

(a) Detection in the Oncoming Vehicle Lane Region

Figure 5:
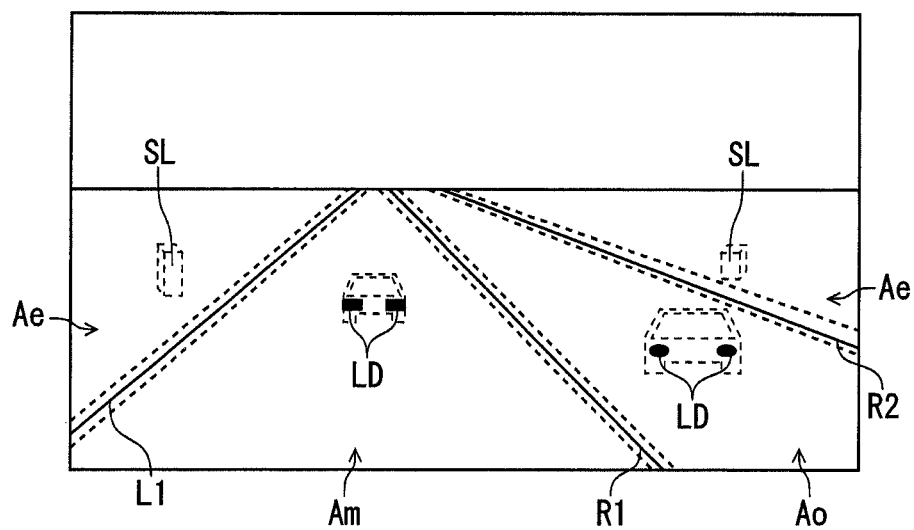
FIG. 5 is a schematic diagram relating to the detection operation for other vehicles.

Referring to FIGS. 5A and 5B, when the point of light is determined to be in an oncoming vehicle lane region Ao (S15) it is determined whether or not a detected point of light LD1 is a point of white light (reference to white here includes pale blue color) (S21). A point of white light is detected as being highly likely to be from a headlight of an oncoming vehicle, and so the point of light is determined to be from an oncoming vehicle. However when the point of light is a non-white point of light, then it is determined to be a high brightness stationary light (S44). When a point of light is detected as being highly likely to be emitted from an oncoming vehicle then the behavior of the point of light is detected with reference to the speed of the vehicle itself obtained from the vehicle speed sensor Sv. If it is determined that the point of white light is not a moving body, then it is determined to be a stationary light SL. However when it is determined that the point of white light is moving in the opposite direction to the vehicle itself, then the point of white light is determined to be an oncoming vehicle (S22, S23). Speedy detection with high accuracy is thereby enabled, without false detection of an oncoming vehicle as being a stationary light.

(b) Detection in the Own Vehicle Lane Region

Referring to FIGS. 5A and 5B, when the determined region is the own vehicle lane region Am (S15), then a determination is made as to whether or not the point of light LD is a point of red light (red here includes the color amber) (S31). If the point of light is determined to be a point of red light, then the point of light is determined to be highly likely to be a point of light emitted from a vehicle ahead, such as the tail light of a vehicle ahead. If the point of light is determined not to be a point of red light, then the point of light is determined to be a high brightness stationary light SL (S44). If the point of red light is determined to be highly likely a point of light emitted from a vehicle ahead, then the behavior of the point of red light with respect to the speed of the vehicle itself also is determined. If it is determined that the point of red light is not a moving body, then the point of light is determined to be a stationary light SL, and if it is determined to be moving in the same direction as the vehicle itself, then the point of light is determined to be from a vehicle ahead (S32, S33). Speedy detection with high accuracy is thereby enabled, without false detection of a vehicle ahead as being a stationary light.

(c) Detection in the Vehicle Lane Exterior Regions

When the region is determined to be a vehicle lane exterior region Ae (S15), the other-vehicle detection section 13 lowers the detection sensitivity for points of light in the vehicle lane exterior regions Ae sectioned by the region sectioning section 12 (S41). The threshold value for detecting a point of light is, for example, raised in the vehicle lane exterior regions Ae in the images of FIGS. 5A and 5B, in order not to detect as a point of light non-high brightness points of light. Accordingly, even if there are stationary lights SL, such as road marker lights and lights and advertising boards on buildings, in the vehicle lane exterior regions, namely on the road edges and road shoulders, such stationary lights SL are not detected as being points of lights captured with a specific illumination level or greater, and hence become points of light outside the scope of detection by the other-vehicle detection section 13. Accordingly, not only is subsequent processing of the points of light corresponding to these stationary lights SL to detect the presence of other vehicles unnecessary, but these point of light can be prevented from being falsely detected as being from other vehicles. This applies both to the vehicle lane exterior region on the own vehicle lane-line side and on the oncoming vehicle lane-line side.

If a point of light with a detection level higher than the threshold value is detected in the vehicle lane exterior region Ae, then this is interpreted as being a stationary vehicle ahead or oncoming vehicle. In such cases, the same processing flow for detection is applied to the processing flow in whichever of the own vehicle lane region or the oncoming vehicle lane region is on the side closest to the relevant vehicle lane exterior region. Namely, when a point of red light is detected in the vehicle lane exterior region on the own vehicle lane region side, then this can be determined to be a stationary vehicle ahead (S42). However, when a point of white light is detected in the vehicle lane exterior region on the oncoming vehicle lane region side, then this can be determined to be from a stationary oncoming vehicle (S43).

By detecting vehicle lane-lines in the captured image and based on the detected lane dividing the captured image into the own vehicle lane region, the oncoming vehicle lane region and the vehicle lane exterior regions, the probability of detecting a vehicle ahead, an oncoming vehicle, and a stationary light can be raised in each of the regions, respectively. This enables the detection accuracy for vehicles ahead and oncoming vehicles to be raised while also enabling speedy detection. Namely, vehicles ahead can be detected by giving priority to detecting points of red light in the own vehicle lane region, and the detection accuracy of a vehicle ahead can also be raised by excluding stationary lights by detecting the behavior of points of the red light as well. Hence processing to detect the attributes of any point of light in the own vehicle lane region (other than points of red light) becomes unnecessary, enabling speedy detection of vehicles ahead and preventing false detection.

Oncoming vehicles also can be detected by giving priority to detecting points of white light in the oncoming vehicle lane region, and the detection accuracy of oncoming vehicle can be raised by excluding stationary lights by detecting the behavior of the points of white light as well. Hence processing to detect the attributes of any point of light in the oncoming vehicle lane region (other than points of white light present) becomes unnecessary, enabling speedy detection of oncoming vehicles and preventing false detection.

Furthermore, by lowering the detection sensitivity for points of light in the vehicle lane exterior regions, namely the road shoulder regions, there are fewer points of light originating from stationary lights present in the vehicle lane exterior regions detected, or there is no such detection made. Accordingly, processing when detecting for other vehicles to detect attributes of such points of light becomes unnecessary, and false detection of these points of light as other vehicles is not made. This contributes to the speed and accuracy of detecting for other vehicles.

Figure 6:
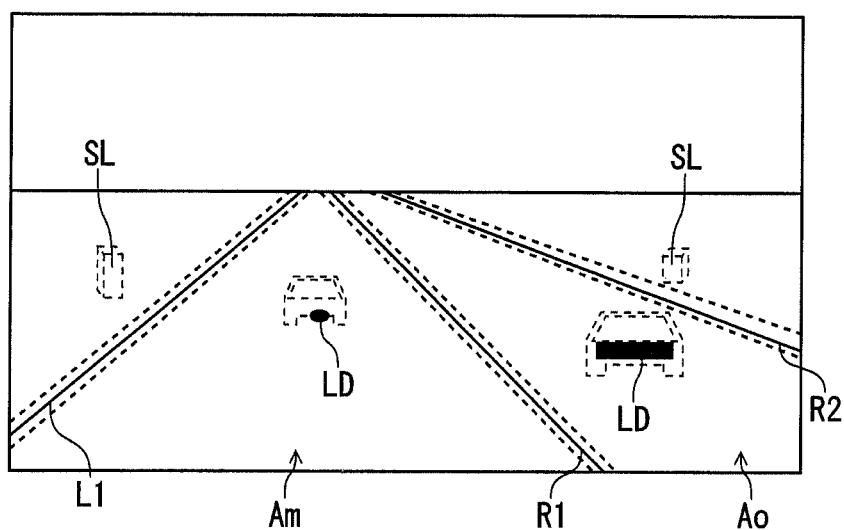
FIG. 6 is a schematic diagram relating to the detection operation for other vehicles using an infrared camera.

In the foregoing example, an imaging camera for visible light is employed. However, configurations can be made with detection for other vehicles in images captured by a far infrared camera instead of a visible light camera. A far infrared camera captures an image of the heat generated by objects. It is possible to capture an image of the far infrared component of light reflected from vehicle lane-line (white paint) markings on a road. It is thus possible, as shown schematically in FIG. 6, to capture images of vehicle lane-lines and to section the captured image into an own vehicle lane region, an oncoming vehicle lane region, and vehicle lane exterior regions. Other vehicles then can be detected in each of the regions based on the captured image of heat sources. For example, high temperature exhaust gas is discharged from the exhaust muffler of a vehicle ahead and the bonnet of an oncoming vehicle is heated by the engine, with these components being captured as points of light LD. Accordingly, if points of light LD of relatively large surface area are detected in the oncoming vehicle lane region Ao, then these points can be determined to be from oncoming vehicles. Similarly, if points of light LD of relatively small surface area are detected in the own vehicle lane region Am, then these points can be determined to be from vehicles ahead. By lowering the detection sensitivity for points of light captured in the vehicle lane exterior regions, points of light from heat sources present at the road shoulder are not detected as points of light, with this being effective in eliminating processing for detecting other vehicles and for reducing false detection.

It is possible to set the temperature in a far infrared camera at which points of light are captured as images. Hence, for example, setting the range of temperatures for image capture in the range of 50° C. to 70° C. prevents pedestrians and the like from being captured as points of light, thereby reducing the number of points of light captured. This enables both the detection accuracy for other vehicles to be raised and contributes to speedy detection.

An explanation has been given in the foregoing description of controlling a pattern of light distribution of a headlight HL according to other vehicle detection with the vehicle detection apparatus 1. However, applications can be made to a headlight control device for controlling the light distribution direction or illumination intensity. Alternatively, configurations can be made such that the vehicle detection apparatus 1 of embodiments described herein not only detect for other vehicles in the region in front of the vehicle, but also detect for the presence of vehicles in other peripheral regions. Applications are, therefore, possible to control the speed and direction of the vehicle itself according to the above detection.

Embodiments described herein are applicable to any vehicle detection apparatus that captures an image of a region in front of the vehicle itself, detects points of light in the captured image, and detects other vehicles based on the detected points of light. Other implementations are within the scope of the claims.

What is claimed is:

1. A vehicle detection apparatus comprising:
   a vehicle lane-line detection module configured to detect a vehicle lane-line marking in an image captured by a vehicle to which the detection module is mounted;
   a region sectioning module configured to section the captured image based on the detected vehicle lane-line marking into an own vehicle lane region, an oncoming vehicle lane region, and a vehicle lane exterior region; and
   an other-vehicle detection module configured to detect points of light and to detect other vehicles based on the points of light and the sectioned image;
   wherein each region of the sectioned image is associated with a different respective detection condition; and
   wherein other vehicles are detected by the other-vehicle detection module by:
      detecting points of light;
      determining, for each detected point of light, a particular region of the sectioned image corresponding to that detected point of light; and
      identifying, for each detected point of light, an other vehicle based on the respective detection condition associated with the particular region.

2. The vehicle detection apparatus of claim 1, wherein the region sectioning module is configured to employ the most distant point on the vehicle lane-line marking as a dividing position.

3. The vehicle detection apparatus of claim 2, wherein for the oncoming vehicle lane region, the other-vehicle detection module is configured to detect other vehicles based at least in part on determining the presence of points of white light.

4. The vehicle detection apparatus of claim 3, wherein for the own vehicle lane region, the other-vehicle detection module is configured to detect other vehicles based at least in part on determining the presence of points of red light.

5. The vehicle detection apparatus of claim 4, wherein for the vehicle lane exterior region, the other-vehicle detection module is configured to detect by other vehicles based at least in part on reducing a detection sensitivity for points of light.

6. The vehicle detection apparatus of claim 2, wherein for the vehicle lane exterior region, the other-vehicle detection module is configured to detect other vehicles based at least in part on reducing a detection sensitivity for points of light.

7. The vehicle detection apparatus of claim 2, wherein for the own vehicle lane region, the other-vehicle detection module is configured to detect other vehicles based at least in part on determining the presence of points of red light.

8. The vehicle detection apparatus of claim 7, wherein for the vehicle lane exterior region, the other-vehicle detection module is configured to detect other vehicles based at least in part on reducing a detection sensitivity for points of light.

9. The vehicle detection apparatus of claim 1, wherein for the oncoming vehicle lane region, the other-vehicle detection module is configured to detect other vehicles based at least in part on determining the presence of points of white light.

10. The vehicle detection apparatus of claim 9, wherein for the own vehicle lane region, the other-vehicle detection module is configured to detect other vehicles based at least in part on determining the presence of points of red light.

11. The vehicle detection apparatus of claim 10, wherein for the vehicle lane exterior region, the other-vehicle detection module is configured to detect other vehicles based at least in part on reducing a detection sensitivity for points of light.

12. The vehicle detection apparatus of claim 9, wherein for the vehicle lane exterior region, the other-vehicle detection module is configured to detect other vehicles based at least in part on reducing a detection sensitivity for points of light.

13. The vehicle detection apparatus of claim 1, wherein for the own vehicle lane region, the other-vehicle detection module is configured to detect other vehicles based at least in part on determining the presence of points of red light.

14. The vehicle detection apparatus of claim 13, wherein for the vehicle lane exterior region, the other-vehicle detection module is configured to detect other vehicles based at least in part on reducing a detection sensitivity for points of light.

15. The vehicle detection apparatus of claim 1, wherein for the vehicle lane exterior region, the other-vehicle detection module is configured to detect other vehicles based at least in part on reducing a detection sensitivity for points of light.

* * * * *